Dec. 31, 1940.    M. GEIJO ET AL    2,227,338
DEVICE FOR INDICATING CHANGES OF DIRECTION IN VEHICLES
Filed Nov. 23, 1938

Manuel Geijo and
Abraham Barreda
INVENTORS

BY *H. Yates Dowell* ATTORNEY.

Patented Dec. 31, 1940

2,227,338

UNITED STATES PATENT OFFICE 2,227,338

DEVICE FOR INDICATING CHANGES OF DIRECTION IN VEHICLES

Manuel Geijo, Ensenada, and Abraham Barreda, La Plata, Argentina

Application November 23, 1938, Serial No. 242,122
In Argentina August 25, 1938

11 Claims. (Cl. 200—59)

The present invention relates to devices for indicating changes in the direction of motion of mechanically propelled vehicles with the aid of electric lamps located at suitable points on the outside of the vehicle.

To this end various apparatus of different kinds have been proposed, but all such devices were designed to be responsive to movements of parts of the vehicle frame or of the front wheels thereof. The known devices suffer from the disadvantage that for their installation it is necessary to effect certain changes in the structure of the vehicle, or to locate them at places which are not easily accessible. Further, on account of their location such devices generally are exposed to the effects of dust and mud which, in spite of the provision of protective means, may find their way into the apparatus and adversely affect its operation.

The present invention has for its object to provide a device of simple and inexpensive construction, which may be easily secured in position, and which is designed to be actuated directly by the steering column. This device may be mounted on the dash-board, on the housing of the steering column or on the floor of the driver's compartment. It consists essentially of a casing having a cover portion and a bottom portion, to which latter a pin is fixed on which is rotatably mounted a disc carrying a bridging member adapted upon rotation of the disc to establish electrical connection between contact elements mounted on a base of insulating material secured to said bottom portion within the casing. The said contact elements consist of an annular member concentric with respect to said pin and a pair of arcuate segments fixed to the base concentrically with said annular member, one segment being positioned on one side and the other on the other side of a diameter of the annular member. To enable the disc to be brought into operative relationship with the steering column, the casing has at a suitable point on its circumference an opening through which a portion of the edge of the disc projects. Actuating means are provided on the edge of said disc to enable it to engage operatively with the steering column or with a toothed portion thereof. Said actuating means may be a layer, band or ring of friction material or teeth formed on or applied to said edge.

The device comprises further the necessary terminals and securing means the form and construction of which latter may vary according to the place of location selected.

The advantages of our improved device reside principally in the fact that it has imparted to it in positive and direct manner and from the steering column itself, the motion which causes the signals to be made; that the device may be installed at a variety of positions inside the vehicle without regard to the chassis or underframe; for instance, besides the positions already indicated, the device may be mounted either upright or inverted, underneath the floor within the space defined by the motor hood, or else on top of the casing enclosing the differential gear. The simplicity of its construction and of the connections to the signal lamps permit of the immediate correction of any impairment caused by wear of parts while, on the other hand, such impairment will not occur very frequently. These, and other advantages of the present invention will clearly appear in the course of the following description thereof.

Figure 1:
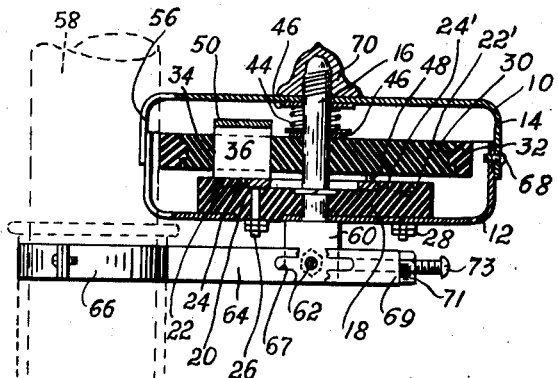
Fig. 1 is a cross-section of one embodiment of the present invention.
Figure 2:
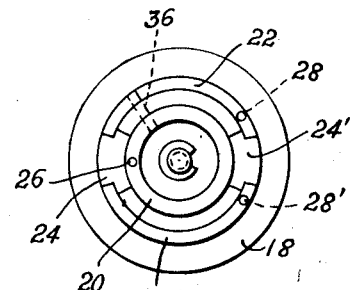
Fig. 2 is a plan view of the fixed base member.
Figure 3:
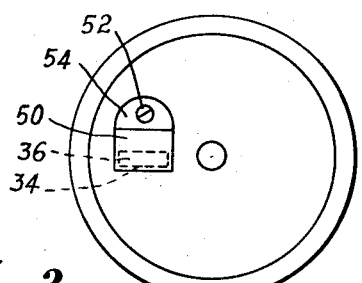
Fig. 3 is a plan view of the upper face of the disc carrying the bridge-member.

As may be seen from the drawing, the device as shown comprises a casing 10 composed of a bottom part 12 and a top part or cover 14, through which a pin 16 projects. In the bottom part 12 a fixed base 18 is mounted concentrically with the pin 16, said base being made of insulating material, for example fiber, and carrying the fixed contact members. These members comprise an annular member 20 (see Fig. 2) and a pair of arcuate segments 22, 22' arranged concentrically with the said ring 20 on either side of a diameter thereof.

The base-member 18 is also provided with resting surfaces 24, 24' of insulating material which extend intermediate the ends of the segments and the upper faces of which are level with the faces of the latter.

From a convenient point of the annular member 20 a terminal 26 extends to the outside of the casing and, similarly, from each segment terminals 28, 28' extend.

Rotatably mounted over the base member 18 is a bridge-carrying disc 30 of greater diameter than that of the base. The edge of this disc carries actuating means which, in the example illustrated, is in the form of a rubber friction ring 32. The said disc 30 is formed with a radial slot 34 constituting a guide for the bridging means 36 which in this embodiment, is shown as a single brush sufficiently wide so as to bridge the annular member 20 and one other of the segments 22, 22'. Clearly the brush may be subdivided into a plurality of parts and may be substituted by a spring wiper finger or the like without departing from the scope of the present invention. The arrangement is such that when in the neutral position, the brush contacts the front resting surface 24, whereas a movement of the disc in one or the other direction will bring the brush into position to bridge the annular member 20 and one or the other of segments 22, 22', thereby establishing electric contact between the fixed contact members.

The disc 30 is spring-urged towards the base 18 by means of a spring 44 placed between washers 46 and surrounding the pin 16, and in order to maintain the disc parallel with respect to the base 18, the surface of the disc adjacent the base 18 is provided with two or more projections 48 of insulating material. The brush 36 is urged towards the base 18 with the aid of independent means, i. e. the leaf spring 50 secured to the upper face of disc 30 by means of a screw 52 and plate 54.

Opposite to the main resting surface 24 the casing 10 has an aperture 56 to permit of a portion of the edge of the disc contacting with the steering column 58 so that, when the device is correctly positioned, the point of contact between the said edge portions and the steering column 58 is in line with brush 36 in its inoperative position.

In order to mount the device in position suitable securing means are provided. In the drawing one preferred form of securing means has been illustrated which comprises a square stud 60 affixed to the outer face of the bottom portion 12 and drilled to receive a traversing bolt 62 serving adjustably to secure the casing to a stirrup shape supporting member 64 carrying at one end a connecting member such as the clamp 66. The securing member has slots 67 in the legs of the stirrup portion and the cross piece 69 has secured to it a nut 71 through which a limit screw 73 is adapted to be screwed to act as a stop for the stud 60.

Figure 6:
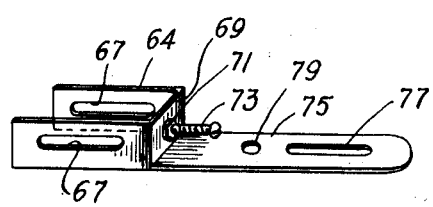
Fig. 6 is a perspective view of an alternative of mounting means.

Alternatively the securing member may be provided with a foot or projection 75 (Fig. 6) which extends from the cross-piece 69 and has a slot 77 adapted to receive a fixing screw and to allow of adjustment and a hole 79 through which a second screw may be passed to prevent displacement.

The foot is used when the device is to be mounted on the floor or the dash-board of the vehicle, and the clamp is used when the device is to be mounted on the housing 68 of the steering shaft 58. If the device is placed opposite a part of the steering shaft normally concealed by the said housing, it will be necessary to provide a cut in the latter so as to permit of the disc 30 contacting with the said shaft.

The two parts of the casing 10 are joined in any convenient manner, provided that access to the interior thereof is afforded to permit of replacement of worn brushes and the like. For instance, the cover portion 14 may overlap the bottom part 12 and be secured to it by screws 68, a cap nut 70 being screwed on to the projecting end of the pin 16 to assist in holding the assembly together.

Figure 4:
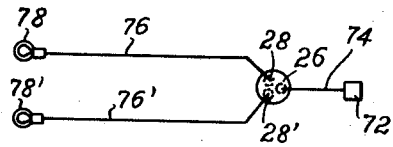
Fig. 4 is a diagram showing the wiring of the device.
Figure 5:
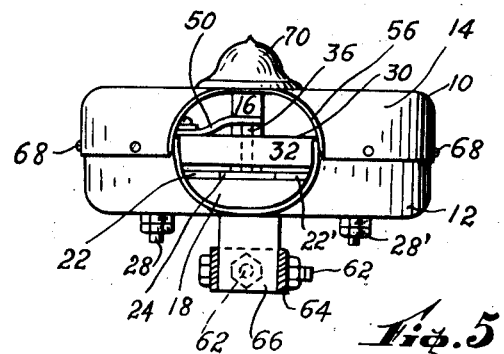
Fig. 5 is a front elevation of the embodiment of Fig. 1.

As may be seen from Fig. 4, the terminal 26 connected to the annular member 20, is in practice connected to the key switch of the vehicle, or to the terminal closing the circuit to the ignition coil as indicated at 72, by means of conductor 74. Terminal 28 corresponding to segment 22 is connected by means of a conductor 76 to an electric light bulb 78 mounted at the rear part of the vehicle, and terminal 28' corresponding to the other segment 22' is connected by means of conductor 76' to a second bulb 78', it being understood that one lamp is located at one side, and the other at the opposite side of the vehicle. Preferably an auxiliary bulb (not shown) is connected in circuit with each of the lamps 78, 78', such second lamp being accommodated in the headlamps so that the signal is given at both ends of the vehicle. When the steering wheel is rotated in order to change the direction of motion of the vehicle, the steering column 58 causes the disc 30 to rotate, whereby the disc 30 moves the brush 36 so as to establish a bridge between the annular member 20 and the segment 22 or 22' as the case may be, thereby closing the circuit of the corresponding bulb 78 or 78', which is thus lighted and gives an indication of the intention of the driver of the vehicle to turn in one or the other direction. The front resting surface 24 is relatively wide in circumferential sense, so as to avoid accidental lighting of the lamps on a momentary oscillation of the steering column through a small angle. The engagement between the steering column and the edge of the disc 30 may be frictional or, as hereinbefore stated, teeth may be provided on the disc adapted to engage the teeth of a toothed collar secured to the steering column or teeth cut in said shaft at a suitable point. These and other modifications of construction and detail are all held to be within the scope of the invention as defined in the appended claims.

What we claim is:

1. An electric indicating device of the kind described for indicating changes in the direction of motion of mechanically propelled vehicles, comprising a casing having a cover portion and a bottom portion, a pin fixed to said bottom portion and extending through said cover portion, a base of insulating material fixedly mounted on said bottom portion within said housing, said pin passing through said base, fixed contact elements mounted on the face of said base remote from said bottom portion, said contact elements including an annular member mounted concentrically with said pin, a pair of arcuate segments mounted concentrically with said annular member on either side of a diameter thereof and terminal means connected individually to said contact elements and extending outside said housing, a disc mounted to rotate on said pin, said disc being spring urged towards the contact carrying face of said base and carrying bridging means positioned upon rotation of the disc in one or the other direction to connect electrically one or the other of said segments to the annular member, an opening in said housing through which a portion of said disc projects, means for securing said upper portion to said bottom portion and mounting means on the outside of said housing for mounting the device inside the vehicle.

2. An electric indicating device of the kind described for indicating changes in the direction of motion of mechanically propelled vehicles, comprising a casing having a cover portion and a bottom portion, a pin fixed to said bottom portion and extending through said cover portion, a base of insulating material fixedly mounted on said bottom portion within said housing, said pin passing through said base, fixed contact elements mounted on the face of said base remote from said bottom portion, said contact elements including an annular member mounted concentrically with said pin, a pair of arcuate segments mounted concentrically with said annular member on either side of a diameter thereof and terminal means connected individually to said contact elements and extending outside said housing, a disc mounted to rotate on said pin and spring urged towards the contact-carrying face of said base, said disc having actuating means provided along its edge and carrying bridging means positioned upon rotation of the disc in one or the other direction to connect electrically one or the other of said segments to the annular member, an opening in said housing through which a portion of said disc projects, means for securing said upper portion to said bottom portion and mounting means on the outside of said housing for mounting the device inside the vehicle.

3. An electric indicating device of the kind described for indicating changes in the direction of moton of mechanically propelled vehicles, comprising a casing having a cover portion and a bottom portion, a pin fixed to said bottom portion and extending through said cover portion, a base of insulating material fixedly mounted on said bottom portion within said housing, said pin passing through said base, fixed contact elements mounted on the face of said base remote from said bottom portion, said contact elements including an annular member mounted concentrically with said pin, a pair of arcuate segments mounted concentrically with said annular member on either side of a diameter thereof and terminal means connected individually to said contact elements and extending outside said housing, a disc mounted to rotate on said pin, and spring urged towards the contact-carrying face of said base, said disc having its edge formed of friction material and carrying bridging means positioned upon rotation of the disc in one or the other direction to connect electrically one or the other of said segments to the annular member, an opening in said housing through which a portion of said disc projects, means for securing said upper portion to said bottom portion and mounting means on the outside of said housing for mounting the device inside the vehicle.

4. An electric indicating device of the kind described for indicating changes in the direction of motion of mechanically propelled vehicles, comprising a casing having a cover portion and a bottom portion, a pin fixed to said bottom portion and extending through said cover portion, a base of insulating material fixedly mounted on said bottom portion within said housing, said pin passing through said base, fixed contact elements mounted on the face of said base remote from said bottom portion, said contact elements including an annular member mounted concentrically with said pin, a pair of arcuate segments mounted concentrically with said annular member on either side of a diameter thereof and terminal means connected individually to said contact elements and extending outside said housing, a disc mounted to rotate on said pin and spring urged towards the contact-carrying face of said base, said disc having teeth formed along its edges and carrying bridging means positioned upon rotation of the disc in one or the other direction to connect electrically one or the other of said segments to the annular member, an opening in said housing through which a portion of said disc projects, means for securing said upper portion to said bottom portion and mounting means on the outside of said housing for mounting the device inside the vehicle.

5. An electric indicating device of the kind described for indicating changes in the direction of motion of mechanically propelled vehicles, comprising a casing having a cover portion and a bottom portion, a pin fixed to said bottom portion and extending through said cover portion, a base of insulating material fixedly mounted on said bottom portion within said housing, said pin passing through said base, fixed contact elements mounted on the face of said base remote from said bottom portion, said contact elements including an annular member mounted concentrically with said pin, a pair of arcuate segments mounted concentrically with said annular member on either side of a diameter thereof and terminal means connected individually to said contact elements and extending outside said housing, a disc mounted to rotate on said pin and spring urged towards the contact-carrying face of said base, said disc having on the face thereof adjacent said base a plurality of projections adapted to bear against said base to keep the disc parallel thereto, bridging means carried by said disc and positioned upon rotation of the disc in one or the other direction to connect electrically one or the other of said segments to the annular member, an opening in said housing through which a portion of said disc projects, means for securing said upper portion to said bottom portion and mounting means on the outside of said housing for mounting the device inside the vehicle.

6. An electric indicating device of the kind described for indicating changes in the direction of motion of mechanically propelled vehicles, comprising a casing having a cover portion and a bottom portion, a pin fixed to said bottom portion and extending through said cover portion, a base of insulating material fixedly mounted on said bottom portion within said housing, said pin passing through said base, fixed contact elements mounted on the face of said base remote from said bottom portion, said contact elements including an annular member mounted concentrically with said pin, a pair of arcuate segments mounted concentrically with said annular member on either side of a diameter thereof and terminal means connected individually to said contact elements and extending outside said housing, a disc mounted to rotate on said pin and spring urged towards the contact carrying face of said base, said disc having actuating means provided along its edge and a radial slot formed in the body of the disc, brush means slidably located in said slot and spring urged towards said base, said slot being so positioned that the brush upon rotation of the disc in one or the other direction bridges the annular member and the one or the other segment to establish electrical connection therebetween, an opening in said housing through which a portion of said disc projects, means for securing said upper portion to said bottom portion and mounting means on the outside of said housing for mounting the device inside the vehicle.

7. A switch unit for use on a mechanically propelled vehicle to indicate right and left hand turns of the vehicle comprising a casing, a block of insulating material fixed in said casing, contact elements secured in said block and exposed on the face thereof and comprising an annular contact member and a pair of contact segments disposed in spaced relation adjacent said annular contact member, there being a gap between said segments to provide a neutral area, a brush of a width sufficient to bridge said annular and segmental contact members, a rotary disc of insulating material to which said brush is secured, said casing being formed with an opening to expose said disc and whereby it may be operated by direct contact with the steering shaft of the vehicle, a spring interposed between said disc and casing normally urging said disc toward said block, said brush being so located with respect to said segments as to come within the neutral area between said segments when the vehicle is moving forward, said area being such as to permit a certain range of turning movement of said shaft without the brush contacting either of said segments.

8. A switch unit for use on a mechanically propelled vehicle to indicate right and left hand turns of the vehicle comprising a casing, a block of insulating material fixed in the base of said casing, contact elements secured in said block and exposed on the face thereof and including a continuous annular contact adapted for connection to a source of current and a pair of segmental arcuate contacts disposed in radially spaced relation adjacent said annular contact, there being gaps between opposite ends of said pairs of segments providing neutral areas at substantially diametrically opposite points with respect to said continuous annular contact, a bridging brush for conducting current from said annular contact to either of said segments and a rotary operating disc of insulating material to which said brush is secured pivotally mounted in said casing and extending radially to within the peripheral area of the casing, said casing being formed with an opening in the periphery thereof for access to said disc and the latter being constructed for operation by direct contact with the steering shaft of the vehicle.

9. In combination in a mechanically propelled vehicle having a steering column, an electrical indicating device of the kind described mounted to be driven by said steering column and comprising a casing having a cover portion and a bottom portion, a pin fixed to said bottom portion and extending through said cover portion, a base of insulating material fixedly mounted on said bottom portion within said housing, said pin passing through said base, fixed contact elements mounted on the face of said base remote from said bottom portion, said contact elements including an annular member mounted concentrically with said pin, a pair of arcuate segments mounted concentrically with said annular member on either side of a diameter thereof and terminal means connected individually to said contact elements and extending outside said housing, a disc mounted to rotate on said pin, said disc being spring urged towards the contact carrying face of said base and carrying bridging means positioned upon rotation of the disc in one or the other direction to connect electrically one or the other of said segments to the annular member, an opening in said housing through which a portion of said disc projects, means for securing said upper portion to said bottom portion and mounting means on the outside of said housing for mounting the device inside the vehicle, the device being so positioned that the projecting portion of the disc is in contact with said steering shaft.

10. In combination in a mechanically propelled vehicle having a steering column including a housing therefor, an electrical indicating device of the kind described mounted to be driven by said steering column comprising a casing having a cover portion and a bottom portion, a pin fixed to said bottom portion and extending through said cover portion, a base of insulating material fixedly mounted on said bottom portion within said housing, said pin passing through said base, fixed contact elements mounted on the face of said base remote from said bottom portion, said contact elements including an annular member mounted concentrically with said pin, a pair of arcuate segments mounted concentrically with said annular member on either side of a diameter thereof and terminal means connected individually to said contact elements and extending outside said housing, a disc mounted to rotate on said pin, said disc being spring urged towards the contact carrying face of said base and carrying bridging means positioned upon rotation of the disc in one or the other direction to connect electrically one or the other of said segments to the annular member, an opening in said housing through which a portion of said disc projects, means for securing said upper portion to said bottom portion and mounting means on the outside of said housing for mounting the device inside the vehicle, said housing being cut away to expose a portion of said steering column and said device being mounted so that the edge of the projecting portion of the disc is in operative engagement with the said exposed portion of the steering column.

11. In combination in a mechanically propelled vehicle having a steering column, an electrical indicating device of the kind described mounted to be driven by said steering column and comprising a casing having a cover portion and a bottom portion, a pin fixed to said bottom portion and extending through said cover portion, a base of insulating material fixedly mounted on said bottom portion within said housing, said pin passing through said base, fixed contact elements mounted on the face of said base remote from said bottom portion, said contact elements including an annular member mounted concentrically with said pin, a pair of arcuate segments mounted concentrically with said annular member on either side of a diameter thereof and terminal means connected individually to said contact elements and extending outside said housing, a disc mounted to rotate on said pin and spring urged towards the contact-carrying face of said base, said disc having teeth formed along its edges and carrying bridging means positioned upon rotation of the disc in one or the other direction to connect electrically one or the other of said segments to the annular member, an opening in said housing through which a portion of said disc projects, means for securing said upper portion to said bottom portion and mounting means on the outside of said housing for mounting the device inside the vehicle, said steering column having a circumferential belt of teeth over a portion thereof and said device being so mounted that the teeth on the edge of the projecting portion of the disc are in operative engagement with the teeth of said belt.

MANUEL GEIJO.
ABRAHAM BARREDA.